US012762271B2

(12) United States Patent
Behera et al.

(10) Patent No.: US 12,762,271 B2
(45) Date of Patent: Oct. 13, 2026

(54) SYSTEM AND METHOD FOR SECURING DIGITAL DATA BY IMPLEMENTING NOISE INJECTION

(71) Applicant: Bank of America Corporation, Charlotte, NC (US)

(72) Inventors: Abhijit Behera, Hyderabad (IN); Maneesh Kumar Sethia, Hyderabad (IN); Sivashalini Sivajothi, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 23 days.

(21) Appl. No.: 19/040,648

(22) Filed: Jan. 29, 2025

(65) Prior Publication Data

US 2026/0220295 A1 Jul. 30, 2026

(51) Int. Cl.
*G06F 21/62* (2013.01)
*G06F 40/284* (2020.01)

(52) U.S. Cl.
CPC ...... *G06F 21/6227* (2013.01); *G06F 21/6245* (2013.01); *G06F 40/284* (2020.01)

(58) Field of Classification Search
CPC . G06F 21/6227; G06F 21/6245; G06F 40/284
See application file for complete search history.

(56) References Cited

U.S. PATENT DOCUMENTS 9,774,578 B1 * 9/2017 Ateniese ............... G06F 3/0673
11,509,459 B2 * 11/2022 Xu .......................... H04L 63/12
2010/0008534 A1 1/2010 Rhoads
(Continued)

FOREIGN PATENT DOCUMENTS

CN 108090042 A * 5/2018 ............. G06F 40/20
CN 120833251 A * 10/2025 ............... G06N 3/08
(Continued)

OTHER PUBLICATIONS

Machine translation of Kang, KR 10-2023-007125, 2 pages (Year: 2023).*
(Continued)

*Primary Examiner* — Christopher A Revak

(57) ABSTRACT

A system for secure data obfuscation includes a memory storing instructions and a processor executing those instructions. The system receives a request to transmit a text-based digital data record, including authentication credentials, and associates a request identifier with the request. A probability distribution for a set of alphanumeric characters is selected, and unique alphanumeric noise is generated using unique random keys. Noise generation involves identifying text locations within the digital data record using a first unique random key and sampling alphanumeric characters from the probability distribution using a second unique random key, ensuring the number of characters matches the identified locations. The system inserts sampled characters into the identified locations, creating an altered digital data record. The first and second random keys, along with the altered record, are stored in a database. Upon verifying authentication credentials, the system transmits the original record or the altered record if verification fails.

20 Claims, 5 Drawing Sheets

(56) References Cited

U.S. PATENT DOCUMENTS

| | | | | |
|---|---|---|---|---|
| 2017/0364705 | A1 | 12/2017 | Villars | |
| 2018/0165466 | A1 | 6/2018 | Rad et al. | |
| 2018/0239914 | A1 | 8/2018 | Chen | |
| 2018/0373757 | A1 * | 12/2018 | Schukovets | G06F 16/221 |
| 2019/0005254 | A1 | 1/2019 | Arasu et al. | |
| 2019/0065776 | A1 | 2/2019 | Jho et al. | |
| 2019/0229833 | A1 | 7/2019 | Ha et al. | |
| 2019/0340381 | A1 | 11/2019 | Yavuz et al. | |
| 2020/0151344 | A1 | 5/2020 | Hsu et al. | |
| 2020/0380091 | A1 | 12/2020 | Bansal | |
| 2021/0067323 | A1 * | 3/2021 | Dambal | H04L 9/083 |
| 2021/0089676 | A1 | 3/2021 | Ford et al. | |
| 2021/0201305 | A1 | 7/2021 | Gonzales, Jr. | |
| 2022/0147645 | A1 * | 5/2022 | Linde | G06F 40/284 |
| 2023/0070762 | A1 | 3/2023 | Yang et al. | |
| 2023/0353271 | A1 | 11/2023 | Lazzaro et al. | |
| 2024/0086561 | A1 | 3/2024 | Adkins | |
| 2024/0403560 | A1 * | 12/2024 | Radu | G06F 40/284 |

FOREIGN PATENT DOCUMENTS

| | | | | | |
|---|---|---|---|---|---|
| KR | 20230071025 | A | * | 5/2023 | H04L 9/08 |
| WO | WO-2012048347 | A1 | * | 4/2012 | H04L 63/06 |

OTHER PUBLICATIONS

Machine translation of Zhang, CN 18090042 A, 2 pages (Year: 2018).*

Machine translation of Liu, CN 120833251 A, 1 page (Year: 2025).*

* cited by examiner

SYSTEM AND METHOD FOR SECURING DIGITAL DATA BY IMPLEMENTING NOISE INJECTION

TECHNICAL FIELD

The present disclosure generally relates to data security, and, more particularly, to a system and method for securing digital data by implementing noise injection.

BACKGROUND

Generative natural language processing models powered by artificial intelligence (AI) are being increasingly adopted across various domains. While these AI systems enhance efficiency and productivity, they also present new vulnerabilities to be used by malicious actors. A prominent threat model involves worms, such as Morris 2, which targets AI systems to extract sensitive information. These worms operate by self-replicating and embedding malicious prompts, enabling unauthorized access to confidential data.

SUMMARY

Modern computer systems are increasingly targeted by malicious actors seeking to use vulnerabilities in authentication processes and data transmission, particularly when handling sensitive information such as personal data and confidential communications. Attackers employ advanced techniques to intercept, manipulate, or steal data, often bypassing traditional security measures. A notable example is the Morris 2 worm, which is a self-replicating malicious program that infiltrates systems by finding software vulnerabilities and spreads across networks to deliver harmful payloads. These payloads can extract sensitive information, corrupt files, or manipulate artificial intelligence (AI) systems to reveal confidential data through malicious prompts, leveraging the reliance of AI models on structured and unstructured data. Preventing the loss of sensitive information and file corruption requires robust solutions to achieve data security.

The proposed system provides a multi-layered approach to prevent or reduce the loss of sensitive information as well as to prevent or reduce data corruption by addressing various shortcomings of traditional techniques. Central to this approach is the introduction of probabilistic noise into digital data records, guided by unique random keys that ensure reversibility. The reversibility allows to accurately reconstruct the original digital data from its obfuscated (noisy) form. The proposed system achieves this by using unique random keys to guide the noise generation and insertion process. These keys allow the exact pattern of noise added to the data to be reproduced during the reverse process. This means that, while the unique random noise makes the data unintelligible to unauthorized users, authorized systems with access to the unique keys can systematically remove the noise and restore the original content.

The introduction of noise effectively obfuscates data requested by unauthorized systems. For instance, when a malicious program infiltrates a system and attempts to access sensitive data, noise is automatically introduced, ensuring that the program only receives corrupt, meaningless data. As a result, sensitive information cannot be extracted. Additionally, the system can configure the malicious program to perceive the noisy data as valid, misleading the attacker into believing they have successfully accessed the sensitive information. This deception reduces further attempts to acquire the data through alternative channels or methods.

The introduced noise can be fully reversible when data is requested by authorized entities. This allows legitimate users or systems access to the original sensitive data without compromise. To ensure the randomness of noise, the obfuscation process is further secured by identifying specific text locations and applying a random shuffle of text indices based on unique keys, adding an additional layer of complexity and protection.

To further safeguard sensitive information and further structure the introduced noise, the system can, in some implementations, employ AI-powered natural language processing (NLP) to identify and replace specific words in a data that requires to be protected with alternative words. Using embedding-based substitution, specific words are replaced with semantically related alternatives that maintain contextual relevance while being untraceable, guided by cosine similarity thresholds. Random keys for determining replacement for specific words are used to control the substitution process, ensuring reproducibility and security. This AI-supported obfuscation approach renders trial-and-error reconstruction practically infeasible for any entity lacking the appropriate random keys and access to the specific random sampling algorithms, offering a substantial improvement over other obfuscation techniques. This specialized approach improves computer technology by effectively preventing unauthorized entities from accessing sensitive data.

The system is designed to prioritize both security and reversibility. By storing random keys alongside the obfuscated digital data, the system effectively secures the information while enabling recovery for authorized entities. Additionally, authentication credentials, such as digital tokens or public-private key pairs, add a layer of user validation, ensuring that only authorized parties can access the data. For unauthorized access attempts, the system transmits only the altered data, effectively safeguarding the original content from being used for malicious or unauthorized purposes.

Beyond text, the system is highly adaptable and can be extended to other data formats, including images, audio, and video. By tailoring the principles of noise addition and obfuscation to these formats, the approach provides a versatile solution for securing a wide range of digital data.

The approach disclosed herein demonstrates a specific implementation that provides an improvement to the field of secure data processing. At the core of this system is the transformation of original data into modified (noisy) data, which serves as a secure version of the original. This transformation involves injecting noise or replacing sensitive elements with obfuscated alternatives, creating a fundamentally altered data record. The transformation process, guided by structured algorithms and random keys, ensures that the altered data cannot be reverse engineered without the specific keys. This process constitutes a transformation of data to a different state or thing, demonstrating that the system performs more than abstract manipulation. Such a data transformation introduces practical and tangible changes to the structure and content of the data, ensuring its security for transmission while preserving the ability to recover the original information under authorized conditions.

In some embodiments, a system discussed herein includes a memory configured to store one or more text-based data records and noise generation instructions. Further, the system includes a processor operably coupled to the memory. The processor is configured to receive a request to transmit a text-based data record and generate a unique alphanumeric noise using the noise generation instructions. The generating of the unique alphanumeric noise includes, based on a first unique random key, randomly generate a 20 set of text locations within the text-based data record using a first random number generator. Further, for each text location from the set of text locations, the processor is configured to generate a random alphanumeric string comprising one or more randomly sampled alphanumeric characters, wherein a number of the one or more randomly sampled alphanumeric characters is randomly selected based on a second unique random key using a second number generator, and wherein each one of the one or more randomly sampled alphanumeric characters is sampled from a probability distribution using a third unique random key. The processor is further configured to insert into the text-based data record the random alphanumeric string, resulting in an altered text-based data record, record in a database the first, second and third unique random keys and the altered text-based data record referenced by a request identifier, verify using authentication credentials a permission to access the text-based data record, transmit the text-based data record upon successful verification of the authentication credentials; and transmit the altered text-based data record upon unsuccessful verification of the authentication credentials.

The practical applications of the system and method discussed herein include securing sensitive data while reducing the likelihood of repeated attacks by malicious actors. This is achieved by providing malicious actors with data that appears to be sensitive but is, in fact, obfuscated and meaningless. By misleading the attacker into believing they have acquired valuable information, the system deters further attempts to access the data through alternative methods. These practical applications demonstrate the system's effectiveness in securing critical data in real-world environments where confidentiality and data integrity are important.

The technical improvements offered by this system include enhancing the robustness of data security systems through the integration of probabilistic noise insertion, reversible obfuscation, and AI-powered natural language processing. This approach advances the underlying technology by enabling secure data transformation that not only prevents unauthorized access but also ensures that authorized users can accurately recover the original data. Furthermore, the system increases the efficiency and adaptability of existing security measures by leveraging multi-layered noise generation techniques, advanced randomization processes, and authentication mechanisms-capabilities that exceed those of conventional methods.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Various embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" can also be used herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

System Overview

Figure 1:
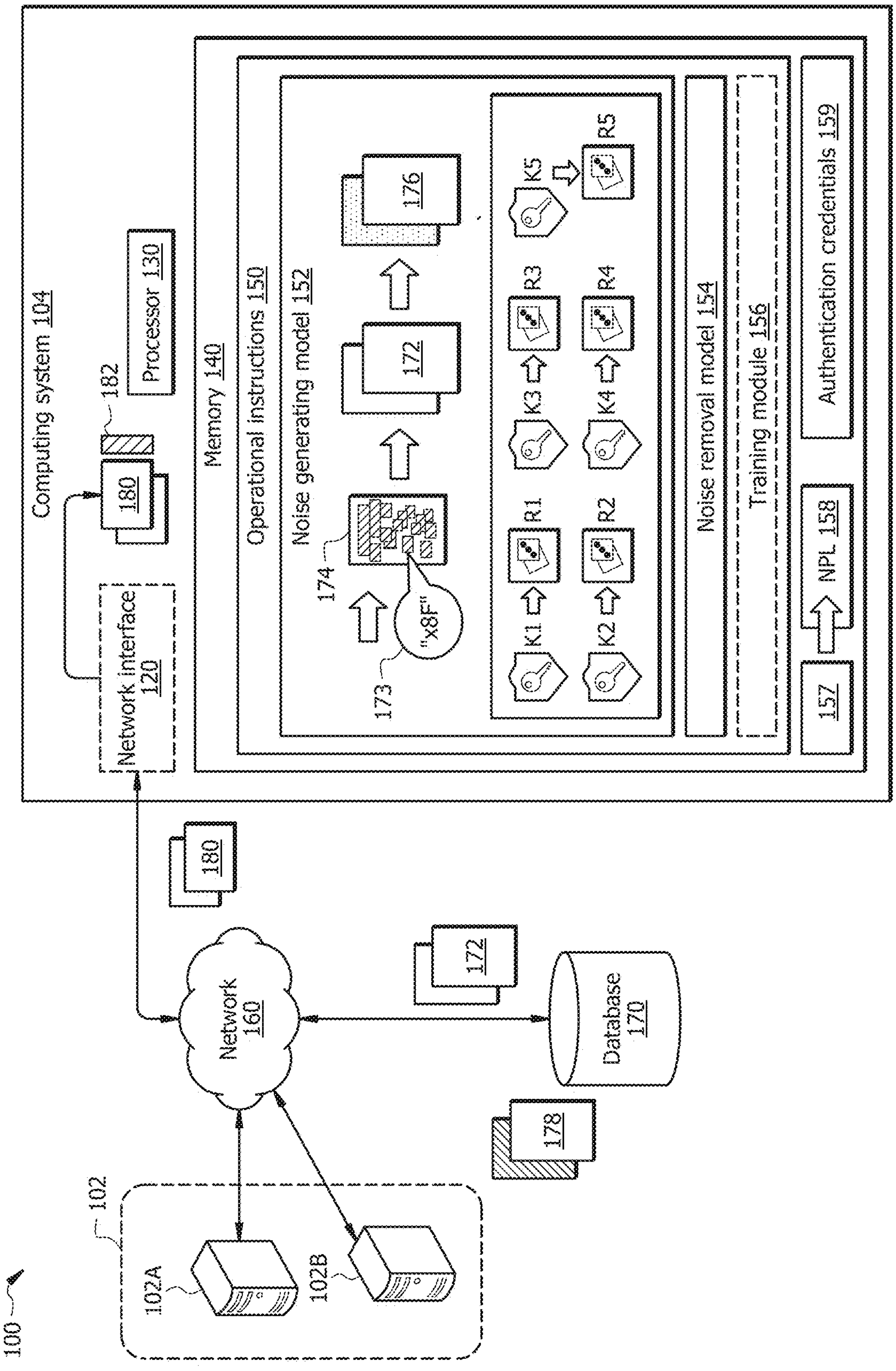
FIG. 1 illustrates a system for securing text-based data record by implementing noise injection, according to an embodiment.
Figure 2A:
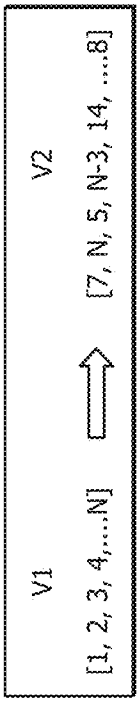
FIG. 2A shows a process of applying a random shuffling to character location indices, according to an embodiment.
Figure 2B:
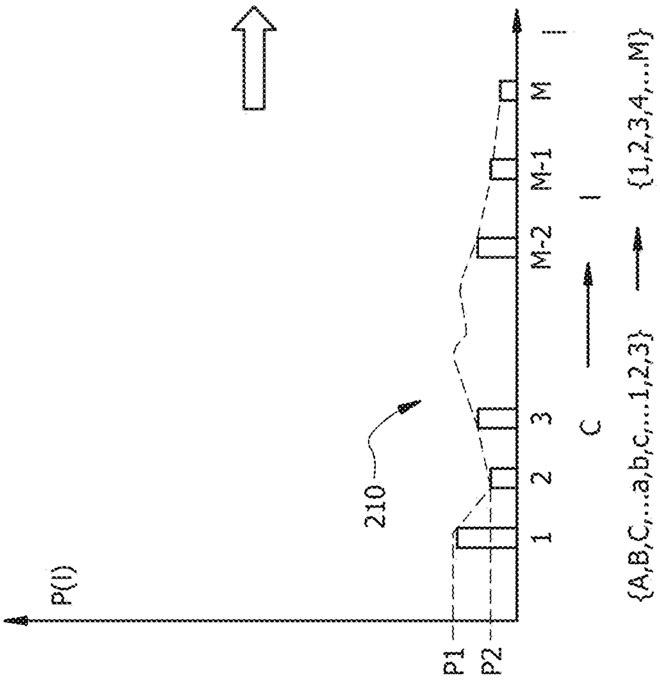
FIGS. 2B and 2C are illustrative plots describing a process of random sampling, according to an embodiment.

FIG. 1 illustrates an embodiment of a system 100 configured to secure digital data by introducing random noise into it. More specifically, the system uses a noise generating model 152 and adds random noise 174 to a text-based data record 172 resulting in an altered text-based data record 176, as further described below. Herein, a term "alphanumeric characters" include any characters or numbers found in text, such as mathematical symbols, punctuation marks, blank spaces, special letters from various alphabets, and the like, as illustrated in FIG. 2B by a set of alphanumeric characters C. Note that random noise 174 comprises sets of random alphanumeric strings of characters, such as a string 173, as shown in FIG. 1.

In various embodiments, text-based data records 172 may be requested by suitable computing devices 102 through the transmission of requests 180 to computing system 104. In some instances, these requests 180 are legitimate, while in others, they may originate from malicious software, such as self-replicating malware (e.g., the Morris worm). Such malicious software is designed to infiltrate computing system 104 and potentially access valuable text-based data records 172. To manage and track different requests effectively, a request identifier 182 can be associated with each request 180.

In some embodiments, system 100 comprises a computing system 104, which can optionally be communicatively coupled with a database 170 via a network 160. Database 170 may be configured to store various text-based data records 172 and transmit these records to computing system 104. Computing system 104 processes these records to introduce random noise 174, as further explained below. Additionally, the records can be further altered using natural language processing (NPL) models such as NPL model 158, as also explained below.

Further, database 170 may store additional data used by computing system 104. For example, it can store training data 178 for training an artificial intelligence (AI) algorithm in computing system 104 to generate an AI model for text-based record processing, as described below. Training data 178 may also be used to update the AI model through further retraining.

In some embodiments, system 100 may not include all the components listed and may have other elements instead of, or in addition to, those mentioned above. For example, in some cases, database 170 may not be present, and computing system 104 may receive text-based data records 172 through other means, such as an input interface.

Computing system 104 is configured to process text-based data records 172 by altering them. The altered text-based data records 176 may be saved for further use, for example, in database 170, or transmitted to a party or application that requests such text-based data records, such as computing devices 102 that may contain several devices 102A and/or 102B. Computing devices 102 can be any suitable devices (e.g., smartphones, personal computers, computer systems, and the like) that can be configured to request information from computing system 104.

In various embodiments, any necessary information for recovering the original records from altered text-based data records 176 may be stored to enable retrieval of unaltered text-based data records 172. Furthermore, in some cases, unaltered text-based data records 172 may be stored together with a relational association to altered text-based data records 176.

System Components

Network

Network 160 may be any suitable type of wireless and/or wired network. Network 160 may be connected to the Internet or public network. Network 160 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network such as Wireless Fidelity (Wi-Fi), Wireless Gigabit (WiGig), Worldwide Interoperability for Microwave Access (WiMAX), etc., a long-term evolution (LTE) network, a universal mobile telecommunications system (UMTS) network, a peer-to-peer (P2P) network, a Bluetooth network, a near-field communication (NFC) network, and/or any other suitable network. Network 160 may include fiber optics, optical fibers, and the like to implement quantum communication channels. Network 160 may be configured to support any suitable type of communication protocol as would be appreciated by one of ordinary skill in the art.

Database

Database 170 can be a scalable storage architecture designed to support a range of data management needs within system 100. Its structure can include various configurations, such as network-attached storage (NAS), cloud storage, storage area networks (SANs), Relational Databases, data warehouses, or any other type of storage that may be directly or indirectly connected to components of system 100. In addition to storing text-based data records 172, database 170 may also store software updates for computing system 104. These updates could include modifications to operational instructions or patches that improve system functionality. When computing system 104 utilizes AI models (as described further below), database 170 may also store updated models, provided either by an external training system (not shown in FIG. 1) or by a training module within computing system 104, as described below, designed to enhance these models. This approach ensures that the AI models within computing system 104 stay updated, allowing them to continuously adapt to new data patterns detected in incoming documents.

In some cases, database 170 is designed to receive text-based data records 172 from other devices communicated via network 160 (not shown in FIG. 1). These external devices could include various servers, client systems, and data repositories distributed across different locations, enabling the aggregation of documents from diverse sources. Such implementation allows database 170 to serve as a centralized storage point for compilation documents, which may then be processed, indexed, or further distributed across various components of system 100 as needed.

Text-Based Data Records

Text-based data records 172 can be stored in database 170 or memory 140 and can be any suitable digital text files. These documents can originate from various formats, including text data, PDF, Word, Excel, among others, allowing for a wide range of document storage and presentation options.

Computing System

Computing system 104 is a hardware computer system configured to classify and process pages of electronic compilation documents. In certain embodiments, computing system 104 may be implemented by a cluster of computing devices, such as virtual machines. For example, computing system 104 may be implemented by a plurality of computing devices using distributed computing and/or cloud computing systems in a network. In certain embodiments, computing system 104 may be configured to provide services and resources (e.g., data and/or hardware resources as described herein, etc.) to other components and devices.

Computing system 104 may comprise a processor 130 operably coupled with a network interface 120 and a memory 140.

Processor

Processor 130 of computing system 104 can comprise one or more processors. Processor 130 can be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. Processor 130 may be a programmable logic device, a microcontroller, a microprocessor, or any suitable number and combination of the preceding. The one or more processors are configured to process data and may be implemented in hardware or software. For example, processor 130 may be 8-bit, 16-bit, 32-bit, 64-bit, or of any other suitable architecture. Processor 130 may include an arithmetic logic unit (ALU) for performing arithmetic and logic operations. Processor 130 may register the supply operands to the ALU and store the results of ALU operations. Processor 130 may further include a control unit that fetches instructions from memory and executes them by directing the coordinated operations of the ALU, registers, and other components. The one or more processors are configured to implement various software instructions. For example, the one or more processors are configured to execute operational instructions 150 to perform various operations of computing system 104 described herein. In this way, processor 130 may be a special-purpose computer designed to implement the functions disclosed herein. The processor 130 is configured to operate to perform one or more operations of methods 400 and 500 as described in corresponding FIGS. 4 and 5.

Network Interface

Network interface 120 of computing system 104 is configured to enable wired and/or wireless communications. It should be noted, that in some cases, the network interface 120 is optional and data to and from computing system 104 may be transmitted via other means (e.g., via suitable input devices).

Network interface 120 may be configured to communicate data between computing system 104 and other components of system 100. For instance, network interface 120 may be used to communicate data between computing system 104 and database 170 via network 160. Network interface 120 may comprise a near-field communication (NFC) interface, a Bluetooth interface, a Zigbee interface, a Z-Wave interface, a radio-frequency identification (RFID) interface, a wireless fidelity (Wi-Fi) interface, a local area network (LAN) interface, a wide area network (WAN) interface, a metropolitan area network (MAN) interface, a personal area network (PAN) interface, a wireless personal area network (WPAN) interface, a modem, a switch, and/or a router. Network interface 120 may be configured to use any suitable type of communication protocol.

Memory

Memory 140 of computing system 104 may be a non-transitory computer-readable medium capable of storing data and instructions. It may be configured as either volatile or non-volatile memory and could include types such as read-only memory (ROM), random-access memory (RAM), ternary content-addressable memory (TCAM), dynamic random-access memory (DRAM), or static random-access memory (SRAM). Additionally, memory 140 may include various storage solutions, such as a local database, a cloud-based database, or network-attached storage (NAS), providing flexibility in data storage options.

The memory can be comprised of one or more storage components, such as disks, tape drives, or solid-state drives, and may serve multiple purposes, including overflow data storage, storing programs selected for execution, and retaining instructions and data accessed during program operation. Memory 140 can store any information referenced in FIGS. 1-4, along with additional data, operational instructions, logic, rules, or code necessary to execute the described functions when accessed by processor 130.

Memory 140 stores operational instructions 150 and text-based data records 172 to facilitate various processing tasks within computing system 104. Operational instructions 150 include computational models for document classification and processing, such as a noise generating model 152, a noise removal model 154, and a training module 156 for developing an AI-based natural language processing (NLP) model 158, as further detailed below.

Additionally, memory 140 is configured to store authentication credentials 159 for various entities. These credentials enable authorization for accessing unaltered text-based data records and facilitate their transmission to authorized entities when such access is permitted.

Computational Models

As described above, computational models include noise generating model 152. In one embodiment, noise generating model 152 is configured to generate a unique random alphanumeric noise (e.g., a noise made of alphanumeric characters). For a specific text such as "user's access number is 234-542-123" a text with noise can be generated that, for example, can look like "ua23␣ ser␣ Al's a234c␣ process name␣ um3␣ beYri471s 2i34-12-54-321-1UH-23" (here added characters are indicated by bold letters and spaces are indicated by "␣" for clarity). The resulting output is a modified or altered text that reads "ua23 ser Al's a234c process name um3 beYri471s 2134-12-54-321-1UH-23", where the noise has been incorporated into the original text. After processing a text-based data record by incorporating noise, the resulting output is referred to herein as an altered text-based data record.

To generate random noise within a text, a set of text character locations can first be identified. Alphanumeric characters are then inserted into these specified locations. For the example shown above, a table of text character locations (first column of Table 1) and their corresponding noise characters (second column of Table 1) is provided below:

TABLE 1

Summary of alphanumeric characters and their positions when inserted into an illustrative text-based data record.

| Character Locations | Noise Characters Inserted | Action |
|---|---|---|
| 1 (after the first character "u") | a23␣ | Inserted after "u" |
| 4 (after "r" in "user's") | ␣Al | Inserted after "r" |
| 8 (after "a" in "access") | 234 | Inserted after "a" |
| 9 (after "c" in "access") | ␣pro | Inserted after "s" |
| 15 (after "n" in "number") | ame␣ | Inserted after "n" |
| 17 (after "m" in "number") | 3␣ | Inserted after "m" |
| 19 (after "e" in "number") | Y | Inserted after "e" |
| 20 (after "r" in "number") | ␣ | Deleted space after "r" |
| 22 (after "I" in "is") | 471 | Inserted after "I" |
| 25 (within "234-542-123") | i | Inserted I before 34 |
| 30 (within "234-542-123") | -3 | Inserted after 54 |
| 31 (within "234-542-123") | 1- | Inserted after 2 |
| 33 (within "234-542-123") | UH- | Inserted after 1 |

When generating noise data, a list (or vector) of character locations can be first determined. In one embodiment, the noise-generating model 152 can generate this vector by randomly selecting character locations based on predefined parameters. For instance, in the example above, the generated vector of character locations is [1, 4, 8, 9, 15, 17, 19, 20, 22, 25, 30, 31, 33]. This vector identifies the positions in the text where noise is introduced. Note that such vector is randomly generated using a suitable computer-based random generator, indicated in FIG. 1 by R1. In an example embodiment, computer-based random generator R1 can be, for example, the Fisher-Yates shuffle. The Fisher-Yates shuffle can be used for randomly reorganizing a list, such as indices in a text, into a completely random order. It ensures that each element has an equal probability of appearing in any position, making it an unbiased and efficient method for shuffling. The process involves iterating through the list of indices for character locations from the last element to the first, and at each step, swapping the current element with another randomly chosen element from the unprocessed portion of the list. Once the list is shuffled, the first n elements can be selected, and if necessary, sorted to provide ordered positions. For example, consider the text "user's access number is 234-542-123" with its length of 35 characters (including spaces). The indices [0, 1, 2, . . . , 35] are shuffled into a random order, such as [33, 1, 15, 8, 20, . . . ]. By selecting the first 13 indices from this shuffled list and sorting them, the resulting indices are [1, 4, 8, 9, 15, 17, 19, 20, 22, 25, 30, 31, 33]. These positions can then be used for inserting random noise into the text, creating an altered version of the text-based data record. Such random shuffling is shown in FIG. 2A wherein vector V1 of indices [1, 2, 3, . . . . N] is randomly shuffled into a vector V2 of indices [7, N, 5, N−3, 14, . . . 8].

It should be noted that Fisher-Yates shuffle is only one possible example, and other approaches can be used for randomly selecting a vector of character locations for insertion of alphanumeric character noise.

In certain cases, the vector of positions used for noise generation can be stored in memory 140 and/or database 170 to facilitate later removal of the noise. However, storing this data introduces potential vulnerabilities, as a malicious party could use it to recover the original data. As an alternative, it may be sufficient to store only a random key K1, as shown in FIG. 1, for computer-based random generator R1. This approach enhances security since random key K1, even if obtained by a malicious party, cannot be used to reconstruct the original data without access to the corresponding random number generator R1. Computer-based random number generator R1, which is a computer program, can be integrated as part of the noise generating model 152, further reducing the risk of unauthorized recovery.

Random key K1, also known as a seed, can be used to reproduce the generation of a random sequence, such as shuffled indices. Random key K1 initializes random number generator (RNG) R1 to a specific state, ensuring that the sequence of "random" operations is entirely deterministic. For example, if you shuffle a list of indices from o to 24 for a text of 35 characters using random key K1, RNG R1 will produce the same shuffled order every time the same key is used. This allows the exact sequence to be reproduced by anyone with knowledge of the key and the process. For instance, shuffling the indices [0, 1, 2, . . . , 35] with a particular key might yields the vector [1, 4, 8, 9, 15, 17, 19, 20, 22, 25, 30, 31, 33] every time the specific random key is used. This method can be used in applications where reproducible randomness is needed, such as cryptography, testing, and simulations.

In various embodiments, the maximum number of text locations where noise is introduced can be defined as a parameter. For example, in the case described above, the number of text locations corresponds to the number of elements in the vector [1, 4, 8, 9, 15, 17, 19, 20, 22, 25, 30, 31, 33], which is 13. This parameter can also be expressed as a ratio of the number of text locations to the total length of the text. In the given example, this ratio is 13/35-0.37. This ratio, referred to as a "ratio parameter," can typically range from about 0.01 to about 0.5. A ratio of 0.5 implies that noise characters are introduced at approximately every other character location, thereby significantly altering the text. The ratio parameter can be defined as part of the configuration process for the noise-generating model 152. Consequently, both the ratio parameter and the random key must be specified to generate the vector of text locations.

Thus, in some embodiments, identifying the set of text locations involves randomly shuffling the text indices using the first unique random key, such as K1, where each text index corresponds to the position of a character within the text-based data record. After the shuffling is completed, the set of text locations is determined by selecting a subset of these shuffled text indices. The number of text locations within such a subset is then determined by the ratio parameter.

Furthermore, after generating the vector of random text locations, such as V2, as shown in FIG. 2A, an alphanumeric character or a set (string) of alphanumeric characters, such as 173, as shown in FIG. 1, can be sampled for each location from the pool of all possible alphanumeric characters. For instance, as illustrated in Table 1, for text location 9 in the phrase "user's access," a string of alphanumeric characters such as "_pro" is sampled. This sampled string is then inserted at the position 9, resulting in a modified text "user's ac process."

Figure 2C:
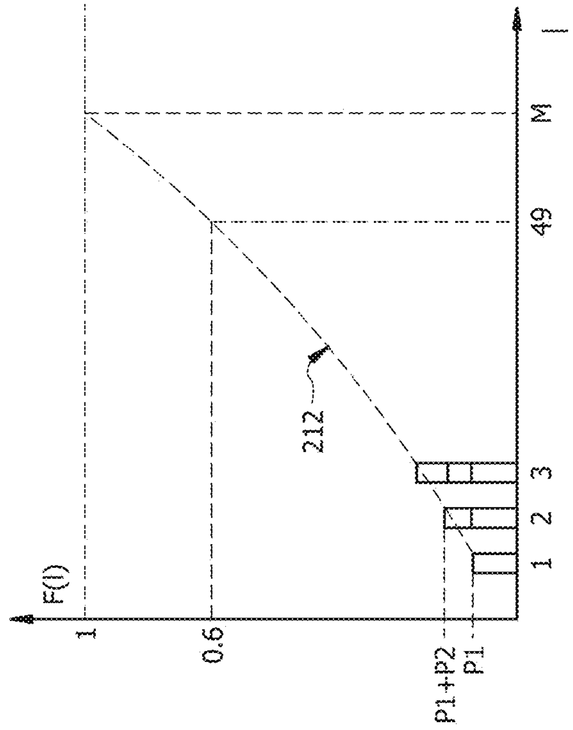

While a single alphanumeric character or a string of alphanumeric characters can be randomly sampled using various methods, an example implementation is depicted in FIGS. 2B and 2C. FIG. 2B illustrates a set of alphanumeric characters {A, B, C, . . . , a, b, c, . . . , 1, 2, 3} mapped to a corresponding set of integers {1, 2, 3, 4, . . . , M}. Each integer represents a unique alphanumeric character, and a probability distribution P (I), shown by graph of a probability distribution 210, is associated with these integers. For example, the character corresponding to integer 1 (character "A") has a selection probability of P1, while the character corresponding to integer 2 (character "B") has a selection probability of P2. Similar probabilities are assigned to the remaining integers up to M, defining the likelihood of selecting each character. FIG. 2C shows the corresponding cumulative probability function F(I) (graph 212), which is calculated by summing the probabilities. For instance, the cumulative probability for integer 1 is P1; for integer 2, it is P1+P2; for integer 3, it becomes P1+P2+P3; and so on, until the cumulative probability for integer M reaches 1 (as the sum of all probabilities is 1). To select a specific integer between 1 and M, a second RNG, shown in FIG. 1 as R2, can be used, distinct from the first RNG (R1, as shown in FIG. 1) used for generating text locations. This second RNG R2 utilizes a separate random key, K2, as shown in FIG. 1, (referred to as the "second random key" to differentiate it from the "first random key" K1 used for text locations) to produce a random number between 0 and 1. For example, if second RNG R2 generates the number 0.6, as shown in FIG. 2C, the corresponding integer is determined to be 49, which maps to the character "w." In this way, selecting random numbers between 0 and 1 enables sampling from the integers 1 through M, which, in turn, allows the selection of the corresponding alphanumeric characters.

In some embodiments, the probability distribution comprises one of a Gaussian distribution or uniform distribution. Furthermore, in some embodiments, the alphanumeric characters comprise an alphabetically arranged set of uppercase letters, an alphabetically arranged set of lowercase letters, and digits ranging from zero to nine, arranged in that order.

Similar to the first random key K1, the second random key K2 can be used to deterministically sample alphanumeric characters, enabling the reproduction of the generated noise.

This is particularly advantageous when the original, unaltered text-based data record 172 needs to be recovered but storing the unaltered data record 172 is not desirable, and only altered text-based date record 176 is stored. For example, this approach can save storage space, and/or reduce security risks by preventing malicious actors from accessing the unaltered text-based data record 172. In such cases, storing only the first random key K1 and second random key K2 is sufficient, as it allows for the recovery of the alphanumeric characters that were sampled and introduced as noise. It should be noted that reversibility may not necessarily need to be enforced; instead, the original text-based data record 172 can be stored directly, eliminating the need to recover it from the altered text-based data record 176.

As previously described, in some cases, instead of selecting a single alphanumeric character for a text location, multiple alphanumeric characters (e.g., a character string) can be selected. In one implementation, for each text location identified by a text location vector (e.g., [1, 4, 8, 9, 15, 17, 19, 20, 22, 25, 30, 31, 33]), a third random key K3, as shown in FIG. 1, can be used with a third RNG R3, as shown in FIG. 1, to determine the number of characters within the character string. For instance, the third RNG R3 might generate the number 3, resulting in a string of 3 characters being selected.

In some cases, the third RNG R3 can operate with a corresponding probability distribution that is skewed toward single characters or short character strings, thereby minimizing the likelihood of long strings being inserted as noise. For example, the probability distribution might assign probabilities as follows:

TABLE 2

Example probability distribution for strings of different lengths.

| String Length (Characters) | Probability |
|---|---|
| 1 | 0.60 |
| 2 | 0.30 |
| 3 | 0.05 |
| 4 | 0.04 |
| 5 | 0.01 |

Such distribution, herein illustrated as an example only, ensures that single-character noise is most likely, while the probability decreases significantly for longer strings. Once the number of characters in the string is determined, the specific characters can be sampled from the set of possible alphanumeric characters and inserted as noise at the designated text location. For example, if the RNG R3 generates a length of 3, a string 173, as shown in FIG. 1, such as "x8F" might be sampled and inserted into the text at the identified location.

It should be noted that the above embodiments for generating random noise are illustrative, and other approaches may also be employed. In particular, when sampling several alphanumeric characters from the cumulative probability function F (I), as shown in FIG. 2C, the function F (I) can be dynamically conditioned based on previously sampled characters. This means that F (I) can be adjusted after each character is sampled to influence the selection of subsequent characters. This approach is particularly advantageous when sampled characters need to form meaningful words or integrate with portions of the text-based data record to create coherent text.

For example, consider a portion of a text-based data record that contains "cess," as in the example above. If the first sampled character to be placed before the letter "c" is "p," then the characters "ro" following "c" could be assigned a high probability of being sampled. This adjustment would result in the formation of the meaningful word "process." Similarly, the number of characters to be sampled for the string could have a high probability of being "3," ensuring that the word "process" is fully constructed. Alternatively, other character combinations may also be prioritized. For instance, after sampling "p," characters such as "re" could be selected with high probability to form the word "precess."

In various embodiments, the probability of selecting subsequent characters is dynamically adjusted to ensure that meaningful words emerge in the altered text-based data record. This is particularly useful for misleading malicious actors, as the presence of coherent, legitimate-looking words can make the altered text appear genuine, rather than just a string of random code. To form logical words with the "cess" suffix, combinations like "pro," "suc," "re," "ex," "repro," and similar prefixes can be assigned higher probabilities, while other combinations are given substantially lower probabilities. This strategic adjustment helps enhance the believability of the altered text while maintaining its security.

In various embodiments, the probability is adjusted using knowledge of a dictionary containing well-known words. For instance, since "process" is a commonly recognized word, the probability of selecting "pro" as a prefix to "cess" can be increased accordingly to reflect that the "process" is a dictionary word.

Figure 3:
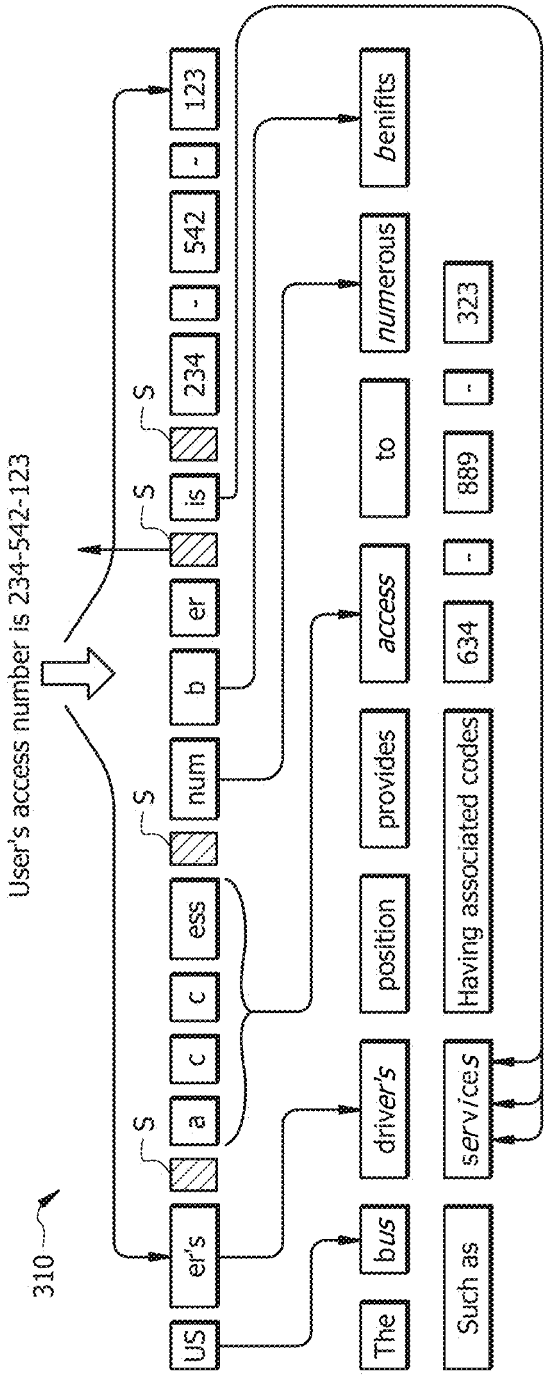
FIG. 3 is a diagram illustrating an embodiment for generating noise within text-based data record, in accordance with an embodiment.

Another implementation of noise generating model 152 is shown in FIG. 3. The text such as "user's access number is 234-542-123" is configured to split into tokens 310, each token is can be selected such that it can form a word when combined with other characters, a single character, or a number. For example, as shown in FIG. 3, tokens 310 include "us," "er's," "" ␣," ," "a," "c," "c," "ess," "" ␣," ," "num," "b," "er," "" ␣," ," "is," "" ␣," ," "234," "-," "542," "-," "123." In FIG. 3, tokens denoted by "S" refer to spaces "" ␣." ." Decomposing text into tokens to form other words involves various approaches depending on the level of granularity and the intended purpose. Character-level tokenization breaks text into individual characters, enabling their recombination into new words. For example, the word "access" can be split and reformed into "ace" and "" ␣ cesspool" (where ␣ represents a blank space, and the bold text indicates added characters). Sub-word tokenization, like Byte Pair Encoding (BPE), divides words into frequent subunits, enabling formations like "process" from "pro" and "cess." Morpheme-based decomposition goes further by splitting text into meaningful units like roots, prefixes, and suffixes, for example, breaking "processing" into "process" and "-ing," which can combine with other morphemes to form new words like "processor." Tokenization splits text into individual character subunits and creates sequences of n tokens (e.g., "ac", "ce" from "access"). In some cases, the tokenization can be performed by a natural language processing (NLP) model which can learn probabilistic or contextual rules for tokenizing and recombining text.

Upon decomposing the text into tokens, each token is processed individually, and new characters are added to transform the token into a word. For example, the tokens "us" and "er's," which originally form the word "user's," are transformed into “us: bus” and “er’s: driver’s,” respectively, by adding “b” to “us” and “driv” to “er’s.” Similarly, other tokens are processed to create a new sentence that is not merely a collection of random code but forms a coherent sentence: “The bus driver’s position provides access to numerous benefits such as services having associated codes 634-889-323.”

As shown in FIG. 3, additional words such as “The,” “position,” “provides,” “to,” and “having associated codes” are introduced to complete the sentence, ensuring logical flow and readability. Notably, with this implementation, as illustrated in FIG. 3, the reversibility of the original text may not be feasible. To recover the original text-based data record, at least some parts of the original text may need to be stored. For enhanced security, this stored text can be saved in an encrypted form. Furthermore, as shown in FIG. 3, numerical values can be entirely replaced with different numbers. For instance, the numbers “234-542-123” in the original text are replaced with “634-889-323.” Since such numerical replacements cannot be derived using mathematical calculations, the original numbers must also be stored for recovery. This approach offers enhanced obfuscation and security, making the transformed text appear as a plausible alternative while protecting the original data.

Please note that benefit of the approach as shown in FIG. 3 is that such process transforms the original text into a meaningful and coherent alternative sentence (“The bus driver’s position provides access to numerous benefits such as services having associated codes 634-889-323”). This makes the altered text appear legitimate and contextually consistent, reducing suspicion if intercepted by a malicious actor. Because the resulting text in this process is a fully formed, meaningful sentence, it is more effective at deceiving malicious actors or unintended recipients. Random noise, even though it can be regenerated using random keys, lacks the appearance of natural language, making it less convincing as a plausible substitute for the original text.

It should be noted that random noise and approach as shown in FIG. 3 can be combined into an approach where both random noise and tokenization may be combined. For example, tokenization can be performed first, and for some of the tokens the words can be reconstructed while for others random alphanumeric characters can be used.

Returning to Table 1, it is demonstrated that in some implementations, characters may not only be added (e.g., introduced as noise) but also deleted. For instance, as shown in Table 1, a space is deleted at text position 20, further obfuscating the altered text-based data record. To enable recovery of the original, unaltered text-based data record, such character deletions must be recorded in memory 140 and/or database 170, allowing for the reverse action to be performed during the recovery process.

Yet another embodiment that is fully reversible involves forming a random mapping between dictionary words. This approach has the advantage of being fully reversible while allowing for the generation of sentences (rather than nonsensical code) to create altered text-based data records. The process can be implemented as follows: each word in a dictionary is assigned a unique integer number. A random mapping is then performed between these integer numbers, effectively associating each word in the dictionary with another word from the same dictionary. This mapping can be controlled by a random number generator (RNG), such as R4, as shown in FIG. 1, ensuring that for a given random key, a specific mapping is consistently generated.

To enhance security, the mapping itself is not stored, avoiding potential exposure to malicious actors. Instead, only the random key responsible for generating the mapping is stored securely. When the mapping is executed, each word in the text-based data record is replaced by its mapped counterpart, forming the altered text-based data record. To recover the original text, the same random key is used to regenerate the mapping via a suitable RNG, allowing the reverse mapping to be applied to the altered data. An example below shows how mapping can be generated using the RNG.

To generate a mapping using the RNG, each word in a dictionary is first assigned a unique integer. For example, “apple” might be assigned the number 1, “tree” the number 2, “banana” the number 3, “cherry” the number 4, “tasty” the number 5, “is” the number 6, and “big” the number 7. Even frequently occurring words such as “is,” “and,” or “the” are assigned unique integers to ensure that every word in the text-based data record can be uniquely mapped and replaced. Using RNG initialized with specific random key, these integers are shuffled to create a randomized mapping. For instance, the original sequence of integers [1, 2, 3, 4, 5, 6, 7] might be shuffled into [3, 5, 6, 1, 4, 2, 7]. This results in a mapping where 1 (“apple”) maps to 3 (“banana”), 2 (“tree”) maps to 5 (“tasty”), 3 (“banana”) maps to 6 (“is”), 4 (“cherry”) maps to 1 (“apple”), 5 (“tasty”) maps to 4 (“cherry”), 6 (“is”) maps to 2 (“tree”), and 7 (“big”) maps to 7 (“big”).

This mapping is then applied to replace each word in the text-based data record with its corresponding mapped word, effectively creating an altered text. For example, if the original text is “apple tree is big” ([1, 2, 6, 7]), the altered text after mapping might become “banana tasty tree big” ([3, 5, 2, 7]). While “banana tasty tree big” may not form a highly meaningful sentence, the mapping process can be refined by introducing additional rules to produce more coherent and semantically appropriate sentences. For instance, the mapping can ensure that nouns are replaced with similar nouns, verbs are replaced with similar verbs, and so on. This can be achieved by categorizing words into separate sets based on their grammatical roles: one set containing nouns, another set containing verbs, and additional sets for adjectives, adverbs, and other parts of speech. Such categorization allows the altered text to retain grammatical consistency and semantic plausibility, even while obfuscating the original content.

Further granularity can be introduced by dividing these sets into more specific categories. For example, nouns related to a particular article of manufacture can be placed in one set, while nouns related to vehicles are contained in another. Similarly, verbs associated with motion can form one set, while verbs related to creation or formation can form a separate set. The mapping rules can then specify that words are replaced only within their respective sets, ensuring that the altered text preserves a logical structure and general semantic consistency. By applying these localized mapping rules, the altered text retains a coherent flow and resembles a meaningful sentence, even after transformation. This approach not only improves the quality of the altered text but also enhances its plausibility and utility in practical applications.

Figure 4:
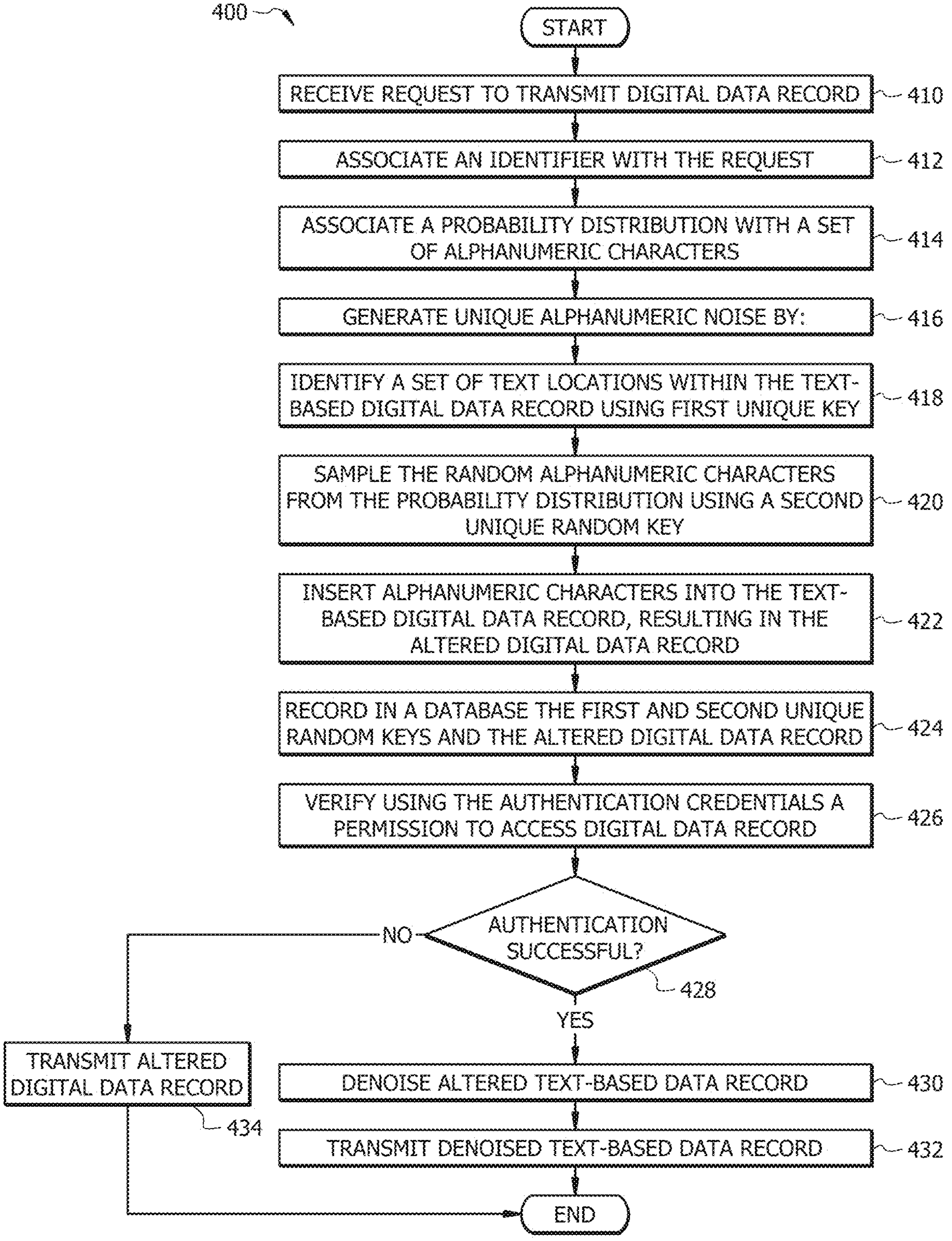
FIG. 4 is a diagram illustrating a method for securing digital data and transmitting it following authentication verification, in accordance with an embodiment.

FIG. 4 shows a method 400 for altering text-based data records to generate an altered text-based data record containing noise. At operation 410, method 400 includes receiving a request, such as request 180, as shown in FIG. 1, to transmit a text-based data record 172. Request 180 can come from a user, an application, or another external system, and it can initiate a process of transmitting text-based data record 172. At operation 412, method 400 includes associating an identifier with the request, such as request identifier 182, as shown in FIG. 1. This identifier can be a unique code, transaction reference, or user ID, which helps the system track and authenticate the request throughout the process.

At operation 414, method 400 includes associating a probability distribution, such as probability distribution 210, as shown in FIG. 2B, with a predefined set of alphanumeric characters C. This distribution defines the likelihood of selecting specific characters when generating noise, allowing the system to control the randomness of the generated noise. The probability distribution can be any suitable probability distribution as shown in FIG. 2B.

At operation 416, method 400 includes generating unique alphanumeric noise 174 to obfuscate the original text-based digital data record 172. This operation is divided into two parts. First, at operation 418, the system identifies a set of text locations within the text-based digital data record where the noise will be inserted. The selection of these locations is driven by a first unique random key K1, which is used to initialize RNG R1. RNG R1 generates a sequence of random positions within the text-based data record 172, ensuring that the locations are distributed unpredictably while maintaining reproducibility. If the same random key K1 is used in the future, the identical set of locations can be regenerated, making the process deterministic and reversible.

At operation 420, method 400 includes sampling random alphanumeric characters from a predefined probability distribution using a second unique random key K2 as a seed. This random key initializes another RNG R2, ensuring that the sampling process is deterministic and reproducible. The probability distribution guides the randomness, ensuring that specific characters or character combinations are selected with controlled likelihoods rather than purely arbitrarily. This statistical control allows for fine-tuning the level and type of noise introduced into the text-based digital data record 172. For example, frequently used characters may have a higher probability of being sampled, while less common characters might appear less frequently, creating a balance between randomness and coherence.

At operation 422, the sampled alphanumeric characters are placed into the previously identified text locations, as determined in earlier steps. Each selected location can accommodate one or more alphanumeric characters based on the system's configuration. For instance, a single character might be inserted for light obfuscation, while strings of characters can be placed for more substantial alteration. This flexibility allows the method to adapt to varying levels of security and data transformation requirements. Once these characters are inserted into the specified locations, they form an altered text-based data record 176. This altered record effectively obfuscates the original content by embedding controlled noise, making it difficult or impossible for unauthorized users to interpret while maintaining a reversible transformation.

At operation 424, method 400 includes recording data in a secure database to ensure reversibility. This step involves storing the first unique random key K1 (used for identifying text locations), the second unique random key K2 (used for character sampling), and the altered digital data record 176. The first random key K1 ensures the ability to reproduce the exact text locations where noise was inserted, while the second random key K2 allows the system to regenerate the same alphanumeric characters during the reconstruction process. Storing the altered text-based data record 176 alongside these keys creates a complete trail that enables precise reconstruction of the original text-based digital data record. This recording step is used for ensuring that the obfuscation can be reversed with perfect accuracy. The secure database safeguards these critical pieces of information, preventing unauthorized access while ensuring availability for authenticated denoising operations.

It should be noted, as previously described, that in some cases a third random key K3 can also be used to select randomly a number of characters that can be inserted for each text locations.

In various embodiments, after preparing the altered text-based data record, a computing system such as system 104 can be configured to determine if an entity requested data is authorized to receive and unaltered original data based on authentication credentials 159, as shown in FIG. 1, for the entity requesting the data. For example, at operation 426, method 400 includes verifying authentication credentials 159 provided with request 180 received at operation 410. This verification step determines whether the requester has the necessary permissions to access the original digital data record.

The authentication performed at operation 426 can involve a variety of mechanisms to verify the identity of the requester and confirm their permissions to access the original digital data record. One common approach is username and password authentication, where the system compares the provided credentials against securely stored records. To enhance security, two-factor authentication (2FA) may be employed, requiring an additional verification step such as a one-time password sent to the requester's mobile device or email.

Token-based authentication, such as the use of API tokens or session tokens, is often implemented for automated systems or API integrations. In cases involving encryption and digital certificates, public key infrastructure (PKI) authentication can verify the requester through digital signatures and key pairs. Access control lists (ACLs) or role-based access control (RBAC) may be used to ensure the requester's role or identity permits access to the specific data. Single sign-on (SSO) systems allow centralized authentication, streamlining access while maintaining security. Additional measures such as IP address based access can limit access to trusted networks, while challenge-response authentication, including security questions or CAPTCHAs, may be used to verify human interaction. Advanced systems can also incorporate behavioral or contextual authentication, analyzing patterns such as typing speed, geolocation, or past login behavior to confirm legitimacy. Depending on the sensitivity of the data, these methods can be used individually or in combination to provide a secure authentication process.

In various embodiments, authentication credentials 159 comprise one of a digital token or a shared public secure key associated with a verified authority, wherein the verified authority possesses a corresponding private key for receiving and decrypting transmitted data.

To support authentication, the system can securely store various types of authentication credentials 159 within database 170 or in memory 140, as illustrated in FIG. 1. For instance, for two-factor authentication, the system can store phone numbers or email addresses to deliver one-time passwords, as well as shared secrets for time-based authentication apps. For token-based authentication, the system may store session tokens, API tokens, or public keys for digital signature verification. Access control lists or role-based access control policies can also be stored, mapping user identities to their permissions. Additionally, contextual information such as previously used IP addresses, geolocation patterns, or device fingerprints may be stored to support behavioral authentication. All sensitive data may be encrypted or hashed and stored in compliance with security standards to protect against unauthorized access.

At decision operation 428, method 400 includes determining whether the authentication is successful. If the authentication is successful (operation 428, Yes), the method proceeds to operation 430, where the altered digital data record undergoes a denoising process. This denoising is performed by a noise removal model 154, which is stored in memory 140, as illustrated in FIG. 1. During the denoising process, noise removal model 154 utilizes the stored random keys, such as the first, second, and third random keys K1-K3 (if a third random key is provided), to reverse the noise insertion process. This involves removing the added characters and recovering the original text-based digital data record. Since the noise generation process is deterministic and reproducible, the denoising operation is guaranteed to be precise. For example, method 400 can include retrieving the altered text-based data record from the database, retrieving the first, the second and the third unique random keys K1-K3, and for each text location from the set of text locations removing from the altered text-based data record the random alphanumeric string, based on RNGs R1-R3, resulting in the original text-based data record. It should be noted that for cases when original text-based data record is stored, denoising can simply comprise retrieving such stored original text-based data record.

Once the denoising is completed by noise removal model 154, method 400 advances to operation 432, where the denoised text-based data record is transmitted to the authenticated entity. After the transmission is completed at operation 432, method 400 concludes.

If the authentication fails (operation 428, No), method 400 proceeds to operation 434. At this step, the altered text-based data record 176 containing the inserted noise is transmitted to the requester. This ensures that unauthorized users are unable to access the original data, preserving the confidentiality of the sensitive information. Following the completion of operation 434, method 400 concludes. This dual-path approach ensures that only authorized users receive the original data while unauthorized users are restricted to the obfuscated version.

Figure 5:
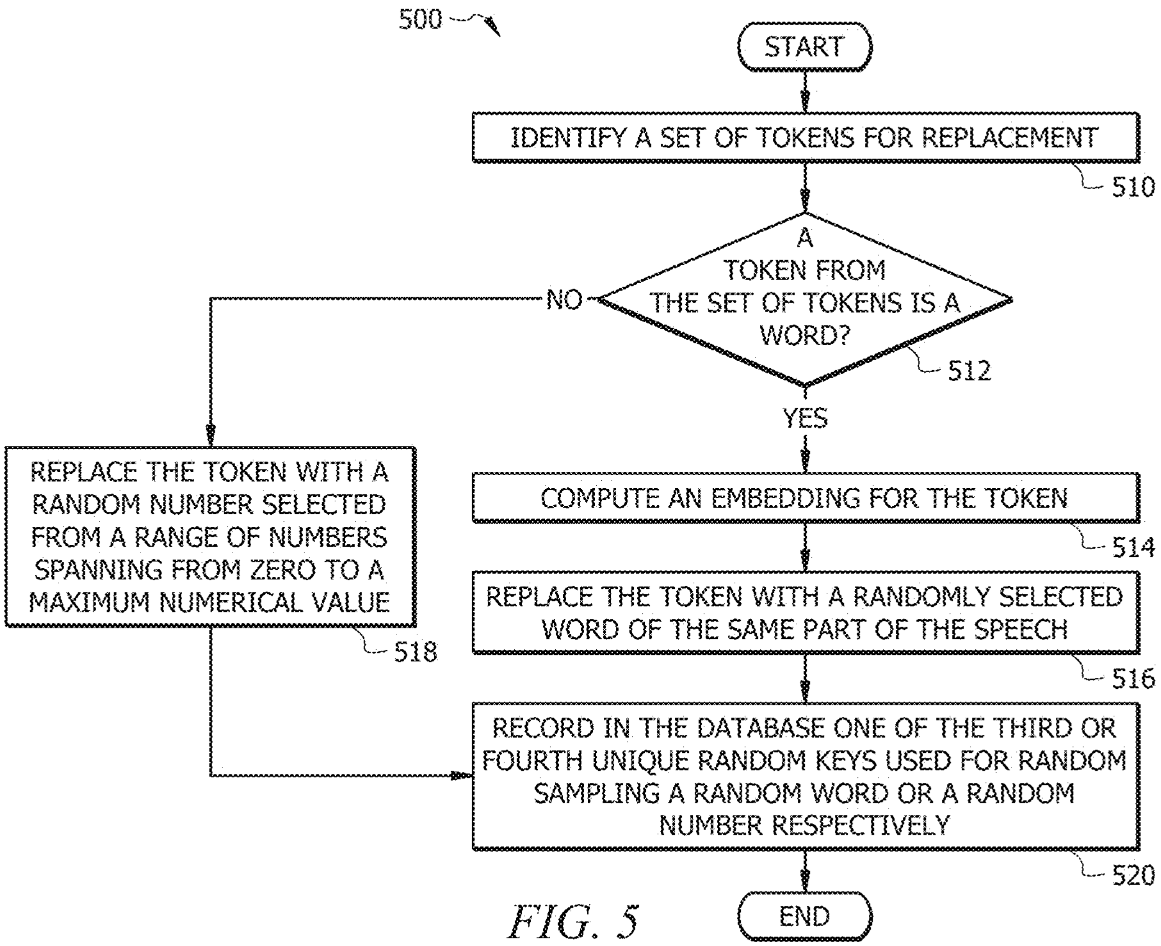
FIG. 5 is a diagram describing an illustrative method for securing digital data, according to an embodiment.

The flowchart in FIG. 5 illustrates a method 500 of another approach of generating obfuscated altered text-based data record containing noise. Method 500 includes identifying tokens within a text-based data record such as text-based data record 172 shown in FIG. 1 and replacing at least some of the tokens identified within text-based data record 172 with alternative tokens. In various embodiments, method 500 is configured to utilize a natural language processing (NLP) model 158 stored in memory 140 of computing system 104, as shown in FIG. 1. NPL model 158 can incorporate decision-making logic for handling tokens based on their type (word or number). In various embodiments, the tokens comprising words within text-based data record 172 are selected from a known library of tokens.

At operation 510, method 500 includes identifying a set of tokens within text-based data record 172 that require replacement. The identification of these tokens is performed by executing NLP model 158. NLP model 158 processes the input data based on a given prompt 157, as shown in FIG. 1, which determines which tokens in the text-based data record are to be targeted for replacement.

Prompts 157 to NLP model 158 can be tailored to target specific tokens within text-based data record 172 for replacement, depending on the application. Prompts 157 may ask model 158 to identify nouns representing people or objects, verbs that describe actions performed by the subject, or numbers that function as identifiers such as IDs or codes. Prompts 157 may be domain-specific and could focus on particular contexts; for example, in financial records, prompts 157 might ask the model to locate currency amounts, percentages, or names of financial institutions, while in technical documents, the model could be directed to highlight technical terms, acronyms, or numerical measurements. Privacy-focused prompts 157 might target personally identifiable information (PII), such as names, addresses, phone numbers, or sensitive data like social security numbers and credit card details, to ensure compliance with privacy standards. Additionally, prompts 157 can be used for text generalization by asking the model to identify specific places, proper nouns, or detailed numerical values for replacement with generalized or approximate alternatives. Creative prompts 157 can guide the model to replace adjectives with unrelated descriptors, introduce synonyms to vary tone or meaning, or select words with different connotations for subtle semantic shifts.

For instance, in the sentence "John's access number is 234-542-123," a prompt could instruct the model to replace names like "John" with other proper nouns such as "Alex," or to substitute access-related terms like "access" with "identification." Numerical tokens such as "234-542-123" could be flagged and replaced with random numerical values like "678-910-345." These examples demonstrate how prompts can be adapted to fit specific requirements for obfuscation, while maintaining a structured and coherent transformation.

Examples of prompts 157 can include: "find all serial numbers and replace them with randomly generated identifiers," "identify all parties' names in the document and replace them with "Party A" and "Party B," "Find all dates in the text and replace them with randomized date values within the same year," "replace all monetary obligations with random values," "locate all email addresses and replace them with anonymized placeholders," "find all phone numbers in the text and replace them with numbers starting with a randomized area code," "identify all references to geographical locations and replace them with generic descriptions," "find all adjectives in the text and replace them with antonyms," "identify all descriptive phrases and replace them alternative descriptive phrases," "locate all verbs related to motion and replace them with verbs describing creation or transformation," "identify all sensitive data fields, such as account numbers, and replace them with randomized numbers of the same length," "find all IP addresses in the text and replace them with randomly generated IP addresses," "locate all URLs and replace them with generic placeholders," and the like. In various embodiments, a combination of prompts can be used. Such illustrative prompts show how specific instructions can be used to guide NLP model 158 to target and modify particular tokens while ensuring that the replacements obfuscate text-based data record 172. Note that above prompts are listed for illustrative purposes only and other similar prompts can be used.

At decision operation 512, method 500 evaluates whether each token in the identified set is a word or not. If the token is determined to be a word (operation 512, Yes), method 500 proceeds to operation 514. At operation 514, method 500 includes computing an embedding vector for the token using a suitable embedding model that can be part of the NLP model. Such embedding vector represents the token's semantic meaning in a high-dimensional vector space.

Various approaches can be employed to compute the embedding vector for a token as described in operation 514. These approaches utilize different embedding models that are often part of or compatible with NLP model 158. One common method involves pre-trained word embeddings, such as Word2Vec, GloVe, or FastText, where the embedding vector is derived from a static lookup table that maps each word to a fixed-dimensional vector based on its semantic meaning.

Another approach is contextualized embeddings, such as those generated by transformer-based models like Bidirectional Encoder Representations from Transformers (BERT), Generative Pre-trained Transformer (GPT), or a Robustly Optimized BERT Pretraining Approach (ROBERTa). These embeddings consider the surrounding words or tokens in the text to produce context-specific vectors. For example, the word "bank" in the context of a financial transaction would have a different embedding vector than the same word in the context of a riverbank. Contextualized embeddings are more robust for tasks requiring nuanced understanding of token meanings.

At operation 516, the token is replaced with a randomly selected word that shares the same part of speech as the original token but has a cosine similarity to the token's embedding below a predefined threshold. The replacement word is sampled from a word-associated probability distribution, ensuring that randomness is controlled. This sampling process is governed, for example, by a unique fourth random key K4, as shown in FIG. 1, which ensures reproducibility of the word replacement. The fourth random key K4 can be used with a suitable RNG such as R4, as shown in FIG. 1

At operation 516, method 500 includes determining the part of speech (POS) of the original token using a POS tagger, which identifies whether the token is a noun, verb, adjective, or other grammatical category based on its context. Once the POS is established, the embedding vector for the token is computed using the embedding model from operation 514, capturing the token's semantic meaning in a high-dimensional vector space. A candidate pool of replacement words is then retrieved, restricted to words that share the same part of speech as the original token. The cosine similarity between the original token's embedding and the embeddings of each word in the candidate pool is calculated to assess semantic similarity. A predefined threshold for cosine similarity is applied, filtering out words that are too semantically similar to the original token to ensure the replacement is meaningfully distinct. For the remaining candidate words, a probability distribution is assigned, with probabilities potentially influenced by factors such as word frequency, relevance, cosine similarity, or predefined weights. Using fourth unique random key K4, RNG R4 samples a replacement word from this probability distribution, ensuring that randomness is both controlled and reproducible. The original token is then replaced with the sampled word, such as replacing "run" with "swim," while ensuring the replacement aligns with the same part of speech and adheres to the cosine similarity threshold. For example, consider the sentence "the farmer conducted a survey to study the ground samples." A possible replacement sentence could be "the athlete ran quickly to reach the finish line." In this case, the cosine similarity between "the farmer" and "the athlete," computed using a pre-trained GloVe model trained on a general corpus such as Common Crawl, is approximately 0.2. This value could serve as an acceptable threshold for semantic divergence, and the replacement process may require the cosine similarity to be less than 0.2. In various embodiments, the cosine similarity threshold can range from 0.1 to 0.7 or beyond, depending on the desired level of semantic distinction. For instance, thresholds of 0.1, 0.2, 0.3, 0.4, 0.5, 0.6, or 0.7 can be selected based on specific use cases. Furthermore, the cosine similarity threshold can vary by part of speech; for example, the threshold for nouns may be adjusted to be different, either lower or higher, by a specified percentage (e.g., 10-90%) compared to verbs or other parts of speech. This flexibility allows for more precise control over the randomness and semantic divergence during token replacement.

The random key used during this process is recorded to ensure that the exact replacement process can be replicated if necessary, allowing the replacement to remain both reversible and deterministic. This method ensures the replacement maintains linguistic coherence while introducing semantic distinctiveness and controlled randomness.

If the token is not a word (operation 512, No), method 500 follows a different path to operation 518. At operation 518, the token, which is a number, is replaced with a random number selected from a range spanning from zero to a maximum numerical value. The random number is generated using a fifth unique random key K5 and an RNG R5, as shown in FIG. 1, which ensures that the number selection process is both random and repeatable. In various embodiments, the generated random number can retain the same number of digits and formatting (e.g., including dashes, dots, colons, or other separators) as the original number.

Finally, at operation 520, method 500 is configured to record the relevant random key (either the fourth unique random key for word replacement or the fifth unique random key for number replacement) in a secure database. This step ensures that the replacement process is reversible, allowing for the reconstruction of the original data when necessary. Once the key is recorded, method 500 concludes, completing the replacement of all tokens in the identified set.

To train NLP model 158 for obfuscating text data effectively, computing system 104, as shown in FIG. 1, can include a training module 156 (also shown in FIG. 1) stored in memory 140 in conjunction with training data 178. The training process includes adapting NPL model 158 to generate altered data that is both secure and sufficiently meaningful to mislead a malicious actor. NLP model 158 can be pretrained on general corpora to understand language structure, grammar, and contextual relationships, followed by fine-tuning on domain-specific training data 178 to learn the vocabulary, phrase patterns, and context relevant to the dataset. This enables NLP model 158 to produce coherent, contextually appropriate replacements for tokens in the original text. The replacement process involves embedding-based similarity control, where the cosine similarity between original and replacement tokens is maintained below a predefined threshold, ensuring the replacements are semantically distinct while preserving linguistic plausibility. Adversarial training can be incorporated to simulate scenarios where a malicious actor requests data using an AI system, enabling the model to produce altered data that appears authentic but obfuscates sensitive content. The model also learns to assign probabilities to replacement tokens based on their contextual appropriateness, introducing controlled randomness to avoid predictable patterns in the altered data.

The obfuscation strategy is designed to counter malicious actors who may repeatedly request it using an AI system to infer the original content. If the altered data is too random or nonsensical, it becomes evident for the malicious actor that the data has been tampered with, encouraging further attempts from malicious actors. Conversely, if the altered data is overly coherent or similar to the original, it risks revealing vulnerable patterns. To address this, NLP model 158 generates obfuscated data that balances meaningfulness and security by using dynamic cosine similarity thresholds for different parts of speech and ensuring consistent but unique obfuscations across multiple requests. For instance, names and numbers may be replaced with tokens of similar structure or format, while verbs and nouns may allow more variation. The goal is to generate altered data that mimics authentic content closely enough to mislead the malicious actor, discouraging further attempts, while maintaining robust protection of the original information.

Training module 156 designed to enhance the obfuscation capabilities of an NLP model can incorporate a simulated malicious actor implemented as a separate AI system. In some embodiments, the primary NLP model is trained to generate altered data by replacing tokens, such as words or numbers, in the original text-based data record with semantically or contextually plausible alternatives. This model uses techniques such as token embeddings, cosine similarity thresholds, probability-based sampling, and controlled randomness to ensure the altered data appears meaningful while obfuscating sensitive information. The simulated malicious actor implemented using an AI system like GPT or BERT, on the other hand, can be configured to analyze the altered data to determine whether it appears authentic or if further attempts are needed to infer the original content.

Fine-tuned on a portion of training data 178 that can containing both original and altered data, the simulated malicious actor evaluates responses for coherence, semantic consistency, and detectable patterns. Based on these factors, it assigns a confidence score indicating whether the altered data is sufficiently plausible. If the malicious actor determines the altered data is too incoherent or tampered, it triggers another simulated data request. The NLP model then generates a new response, introducing additional variations or refining its replacement strategy, such as using stricter cosine similarity thresholds or more randomized replacements. This process continues iteratively until the malicious actor AI either declares the data sufficiently authentic or exhausts a predefined number of attempts. Through this adversarial feedback loop, the NLP model learns to produce responses that consistently deceive the malicious actor by dynamically adjusting its parameters and improving its obfuscation strategies. For example, an original sentence like "The farmer analyzed soil samples collected during the survey" might be altered first to "The athlete evaluated ground materials gathered during the report," which the malicious actor identifies as insufficiently coherent, prompting a second attempt that generates "The scientist inspected geological findings obtained from the research." The malicious actor may then determine this response as sufficiently plausible. This adaptive training process ensures that NLP model 158 becomes trained at balancing obfuscation and plausibility, effectively resisting sophisticated attempts by a malicious actor to infer the original content, even when leveraging advanced AI tools.

In various embodiments, the simulated malicious actor AI can be trained to analyze altered data and determine its authenticity or the need for further attempts. Initially, the simulated malicious actor, such as GPT or BERT, can be pretrained on a large corpus of general language data to develop a general understanding of grammar, semantics, and contextual relationships. This pretraining is followed by fine-tuning on paired portion of training data 178 that can include original and altered text-based data records. Through this fine-tuning, the simulated malicious actor AI learns to detect patterns, inconsistencies, or semantic gaps in the altered data, such as overused replacement tokens, incoherent structures, or formatting anomalies. Adversarial examples are introduced to enhance its ability to recognize subtler obfuscation strategies, encouraging the simulated malicious actor AI to assign confidence scores indicating whether the data is authentic or obfuscated. Additionally, realistic attack scenarios are simulated, allowing the simulated malicious actor AI to make repeated requests to the obfuscation system, analyze altered data, and adapt its strategy based on observed patterns. In these scenarios, the simulated malicious actor AI decides whether to accept the data as authentic or request additional attempts to infer the original content. This iterative training process ensures the simulated malicious actor AI becomes adept at detecting obfuscation patterns and evaluating data plausibility, making it an effective tool for testing and strengthening the obfuscation system by ensuring altered data remains secure and misleading to potential malicious actors.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A system comprising:

a memory configured to store one or more text-based data records and operational instructions; and a processor operably coupled to the memory and configured to:

receive a request to transmit a text-based data record;

generate unique alphanumeric noise using noise generation instructions, wherein generating the unique alphanumeric noise comprises:

based on a first unique random key, randomly generate a set of text locations within the text-based data record using a first random number generator;

for each text location from the set of text locations:

generate a random alphanumeric string comprising one or more randomly sampled alphanumeric characters, wherein a number of the one or more randomly sampled alphanumeric characters is randomly selected based on a second unique random key using a second number generator, and wherein each one of the one or more randomly sampled alphanumeric characters is sampled from a probability distribution using a third unique random key; and insert into the text-based data record the random alphanumeric string, resulting in an altered text-based data record;

record in a database the first, second and third unique random keys and the altered text-based data record referenced by a request identifier;

verify using authentication credentials a permission to access the text-based data record;

transmit the text-based data record upon successful verification of the authentication credentials; and transmit the altered text-based data record upon unsuccessful verification of the authentication credentials.

2. The system of claim 1, wherein the probability distribution comprises one of a Gaussian distribution or uniform distribution and wherein alphanumeric characters comprise an alphabetically arranged set of uppercase letters, an alphabetically arranged set of lowercase letters, and digits ranging from zero to nine, arranged in that order.

3. The system of claim 1, wherein identifying the set of text locations comprises:

randomly shuffling text indices based on the first unique random key, wherein each text index from the text indices corresponds to a position of a text character within the text-based data record; and selecting a subset of the text indices as the set of text locations.

4. The system of claim 1, wherein at least some alphanumeric characters comprise a blank space.

5. The system of claim 1, wherein the memory is configured to store a natural language processing model, and wherein the processor is further configured to:

execute the natural language processing model to identify a set of tokens within the text-based data record requiring replacement, wherein the set of tokens is identified based on a prompt input to the natural language processing model;

for each token in the set of tokens, prior to identifying the set of text locations and inserting at each text location the random alphanumeric string:

if the token is a word, compute an embedding for the token and replace it with a randomly selected word from a set of words that shares a part of speech but has a cosine similarity to the embedding for the token being below a predefined threshold, wherein the randomly selected word is sampled from a word-associated probability distribution based on a fourth unique random key;

if the token is a number, replace it with a random number selected from a range of numbers spanning from zero to a maximum numerical value, wherein the random number is selected based on a fifth unique random key; and record in the database one of the fourth or the fifth unique random key.

6. The system of claim 5, wherein tokens from the set of tokens comprising words are selected from a known library of tokens.

7. The system of claim 1, wherein the authentication credentials comprise at least one of: a digital token or a shared public secure key associated with a verified authority, wherein the verified authority possesses a corresponding private key for receiving and decrypting transmitted data.

8. The system of claim 1, wherein the processor is further configured to:

retrieve the altered text-based data record from the database;

retrieve the first, the second and the third unique random keys; and for each text location from the set of text locations remove from the altered text-based data record the random alphanumeric string, resulting in the text-based data record.

9. A method comprising:

receiving a request to transmit a text-based data record;

generating unique alphanumeric noise, wherein generating the unique alphanumeric noise comprises:

based on a first unique random key, randomly generating a set of text locations within the text-based data record using a first random number generator;

for each text location from the set of text locations:

generating a random alphanumeric string comprising one or more randomly sampled alphanumeric characters, wherein a number of the one or more randomly sampled alphanumeric characters is randomly selected based on a second unique random key using a second number generator, and wherein each one of the one or more randomly sampled alphanumeric characters is sampled from a probability distribution using a third unique random key; and inserting into the text-based data record the random alphanumeric string, resulting in an altered text-based data record;

recording in a database the first, second and third unique random keys and the altered text-based data record referenced by a request identifier;

verifying using authentication credentials a permission to access the text-based data record;

transmitting the text-based data record upon successful verification of the authentication credentials; and transmitting the altered text-based data record upon unsuccessful verification of the authentication credentials.

10. The method of claim 9, wherein the probability distribution comprises one of a Gaussian distribution or uniform distribution and wherein alphanumeric characters comprise an alphabetically arranged set of uppercase letters, an alphabetically arranged set of lowercase letters, and digits ranging from zero to nine, arranged in that order.

11. The method of claim 9, wherein identifying the set of text locations comprises:

randomly shuffling text indices based on the first unique random key, wherein each text index from the text indices corresponds to a position of a text character within the text-based data record; and selecting a subset of the text indices as the set of text locations.

12. The method of claim 9, further comprising:

executing a natural language processing model to identify a set of tokens within the text-based data record requiring replacement, wherein the set of tokens is identified based on a prompt input to the natural language processing model;

for each token in the set of tokens, prior to identifying the set of text locations and inserting at each text location the random alphanumeric string:

if the token is a word, computing an embedding for the token and replace it with a randomly selected word from a set of words that shares a part of speech but has a cosine similarity to the embedding for the token being below a predefined threshold, wherein the randomly selected word is sampled from a word-associated probability distribution based on a fourth unique random key;

if the token is a number, replacing it with a random number selected from a range of numbers spanning from zero to a maximum numerical value, wherein the random number is selected based on a fifth unique random key; and recording in the database one of the fourth or the fifth unique random key.

13. The method of claim 12, wherein tokens from the set of tokens comprising words are selected from a known library of tokens.

14. The method of claim 9, wherein the authentication credentials comprise one of: a digital token or a shared public secure key associated with a verified authority, wherein the verified authority possesses a corresponding private key for receiving and decrypting transmitted data.

15. A non-transitory computer-readable medium storing instructions that, when executed by a processor, cause the processor to:

receive a request to transmit a text-based data record;

generate unique alphanumeric noise, wherein generating the unique alphanumeric noise comprises:

based on a first unique random key, randomly generating a set of text locations within the text-based data record using a first random number generator;

for each text location from the set of text locations:

generate a random alphanumeric string comprising one or more randomly sampled alphanumeric characters, wherein a number of the one or more randomly sampled alphanumeric characters is randomly selected based on a second unique random key using a second number generator, and wherein each one of the one or more randomly sampled alphanumeric characters is sampled from a probability distribution using a third unique random key; and insert into the text-based data record the random alphanumeric string, resulting in an altered text-based data record;

record in a database the first, second and third unique random keys and the altered text-based data record referenced by a request identifier;

verify using authentication credentials a permission to access the text-based data record;

transmit the text-based data record upon successful verification of the authentication credentials; and transmit the altered text-based data record upon unsuccessful verification of the authentication credentials.

16. The non-transitory computer-readable medium of claim 15, wherein the probability distribution comprises one of a Gaussian distribution or uniform distribution and wherein alphanumeric characters comprise an alphabetically arranged set of uppercase letters, an alphabetically arranged set of lowercase letters, and digits ranging from zero to nine, arranged in that order.

17. The non-transitory computer-readable medium of claim 15, wherein identifying the set of text locations comprises:

randomly shuffling text indices based on the first unique random key, wherein each text index from the text indices corresponds to a position of a text character within the text-based data record; and selecting a subset of the text indices as the set of text locations.

18. The non-transitory computer-readable medium of claim 15, wherein the processor is further configured to:

execute a natural language processing model to identify a set of tokens within the text-based data record requiring replacement, wherein the set of tokens is identified based on a prompt input to the natural language processing model;

for each token in the set of tokens, prior to identifying the set of text locations and inserting at each text location the random alphanumeric string:

if the token is a word, compute an embedding for the token and replace it with a randomly selected word from a set of words that shares a part of speech but has a cosine similarity to the embedding for the token being below a predefined threshold, wherein the randomly selected word is sampled from a word-associated probability distribution based on a fourth unique random key;

if the token is a number, replace it with a random number selected from a range of numbers spanning from zero to a maximum numerical value, wherein the random number is selected based on a fifth unique random key; and record in the database one of the fourth or the fifth unique random key.

19. The non-transitory computer-readable medium of claim 18, wherein tokens from the set of tokens comprising words are selected from a known library of tokens.

20. The non-transitory computer-readable medium of claim 15, wherein the processor is further configured to:

retrieve the altered text-based data record from the database;

retrieve the first, the second and the third unique random keys; and for each text location from the set of text locations remove from the altered text-based data record the random alphanumeric string, resulting in the text-based data record.

* * * * *